(12) United States Patent
Hartman et al.

(10) Patent No.: US 11,072,123 B2
(45) Date of Patent: Jul. 27, 2021

(54) DEVIANT CONTROL IN ADDITIVE MANUFACTURING

(71) Applicant: HEWLETT-PACKARD DEVELOPMENT COMPANY, L.P., Houston, TX (US)

(72) Inventors: Aja Hartman, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 226 days.

(21) Appl. No.: 16/077,320

(22) PCT Filed: Jan. 18, 2017

(86) PCT No.: PCT/US2017/013914
§ 371 (c)(1),
(2) Date: Aug. 10, 2018

(87) PCT Pub. No.: WO2018/136048
PCT Pub. Date: Jul. 26, 2018

(65) Prior Publication Data
US 2019/0054702 A1    Feb. 21, 2019

(51) Int. Cl.
*B29C 64/393*    (2017.01)
*B29C 64/165*    (2017.01)
(Continued)

(52) U.S. Cl.
CPC .......... *B29C 64/393* (2017.08); *B29C 64/165* (2017.08); *B33Y 10/00* (2014.12);
(Continued)

(58) Field of Classification Search
None
See application file for complete search history.

(56) References Cited

U.S. PATENT DOCUMENTS 5,427,733 A * 6/1995 Benda ................... B22F 3/1055
    419/1
6,896,839 B2 * 5/2005 Kubo .................... B29C 64/153
    264/109
(Continued)

FOREIGN PATENT DOCUMENTS

CN    105916665    8/2016
JP    2002-292747    10/2002
(Continued)

OTHER PUBLICATIONS

Molitch-Hou, "The Future of HP's Multi Jet Fusion 3D Printing", Retrieved from Internet—https://www.engineering.com/3DPrinting/3DPrintingArticles/ArticleID/12298/The-Future-of-HPs-Multi-Jet-Fusion-3D-Printing.aspx, Jun. 6, 2016, 7 Pages.

*Primary Examiner* — Joseph S Del Sole
*Assistant Examiner* — Baileigh Kate Darnell
(74) *Attorney, Agent, or Firm* — Dierker & Kavanaugh PC

(57) ABSTRACT

In one example, an additive manufacturing process includes: making an object slice by slice, including dispensing a first quantity of each of multiple liquid functional agents on to a layer of fusable build material and then irradiating the layer of build material; while making the object, identifying a deviant region in a slice; and dispensing a second quantity different from the first quantity of at least one of the functional agents into a location corresponding to the deviant region.

8 Claims, 15 Drawing Sheets

(51) Int. Cl.
  *B33Y 30/00* (2015.01)
  *B33Y 10/00* (2015.01)
  *G01N 25/72* (2006.01)
  *B33Y 50/02* (2015.01)
  *G01N 21/00* (2006.01)

(52) U.S. Cl.
  CPC .............. *B33Y 30/00* (2014.12); *B33Y 50/02* (2014.12); *G01N 21/00* (2013.01); *G01N 25/72* (2013.01)

(56) References Cited

U.S. PATENT DOCUMENTS

| | | | | |
|---|---|---|---|---|
| 6,930,278 | B1 * | 8/2005 | Chung | B33Y 30/00 |
| | | | | 219/121.85 |
| 7,718,933 | B2 * | 5/2010 | Huskamp | B22F 3/1055 |
| | | | | 219/494 |
| 2002/0105114 | A1 * | 8/2002 | Kubo | B29C 64/165 |
| | | | | 264/497 |
| 2004/0200816 | A1 * | 10/2004 | Chung | B33Y 30/00 |
| | | | | 219/121.83 |
| 2007/0036199 | A1 * | 2/2007 | Ouyang | G01N 25/72 |
| | | | | 374/120 |
| 2007/0047796 | A1 * | 3/2007 | Anantharaman | G01N 25/72 |
| | | | | 382/141 |
| 2008/0262659 | A1 * | 10/2008 | Huskamp | G05D 23/27 |
| | | | | 700/300 |
| 2010/0140852 | A1 | 6/2010 | Kritchman et al. | |
| 2011/0107967 | A1 * | 5/2011 | Hopkinson | B29C 67/02 |
| | | | | 118/708 |
| 2014/0314613 | A1 * | 10/2014 | Hopkinson | B33Y 50/02 |
| | | | | 419/55 |
| 2016/0074965 | A1 * | 3/2016 | Jakimov | B23K 26/032 |
| | | | | 219/76.12 |
| 2016/0098824 | A1 * | 4/2016 | Fry | G05B 19/41875 |
| | | | | 700/108 |
| 2017/0106595 | A1 * | 4/2017 | Gunther | B33Y 30/00 |

FOREIGN PATENT DOCUMENTS

| | | |
|---|---|---|
| JP | 2014527481 | 10/2014 |
| JP | 2019-521006 | 7/2019 |
| WO | 2014039378 A1 | 3/2014 |
| WO | WO-2015108546 A2 * | 7/2015 ............ B29C 64/393 |
| WO | WO-2015108560 A1 * | 7/2015 ............ B29C 64/393 |
| WO | 2015149742 A1 | 10/2015 |
| WO | 2015167520 A1 | 11/2015 |
| WO | 2016010192 A1 | 1/2016 |
| WO | 2016122660 A1 | 8/2016 |
| WO | WO-2016171724 | 10/2016 |

\* cited by examiner

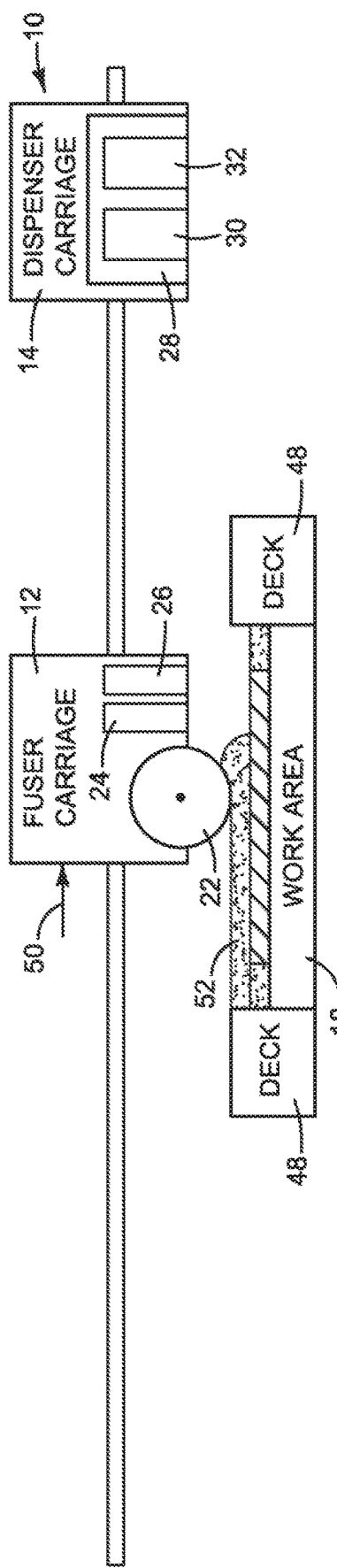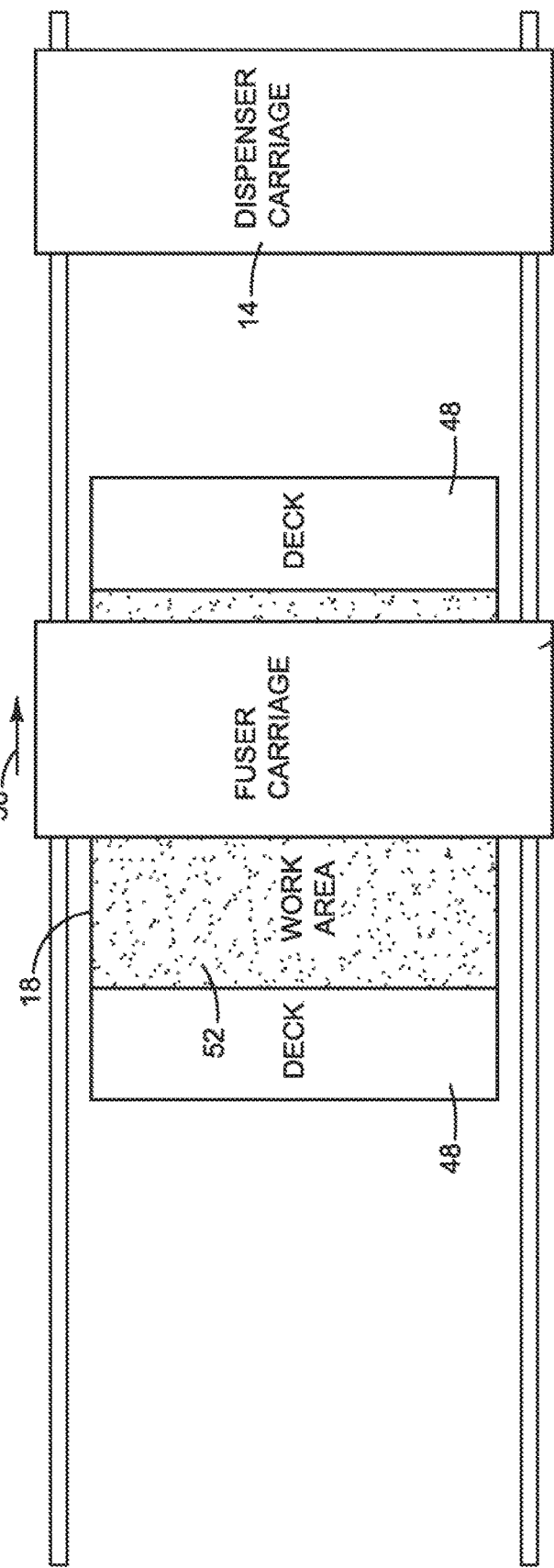

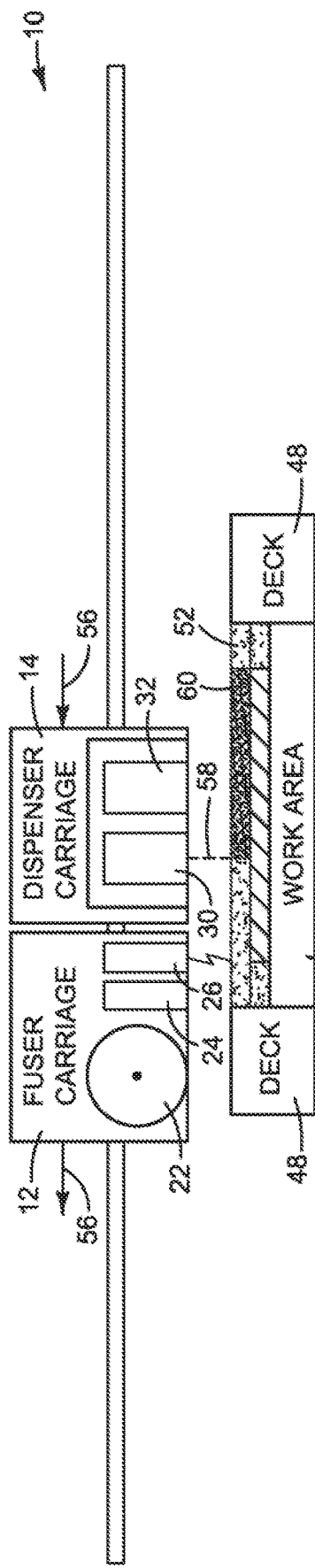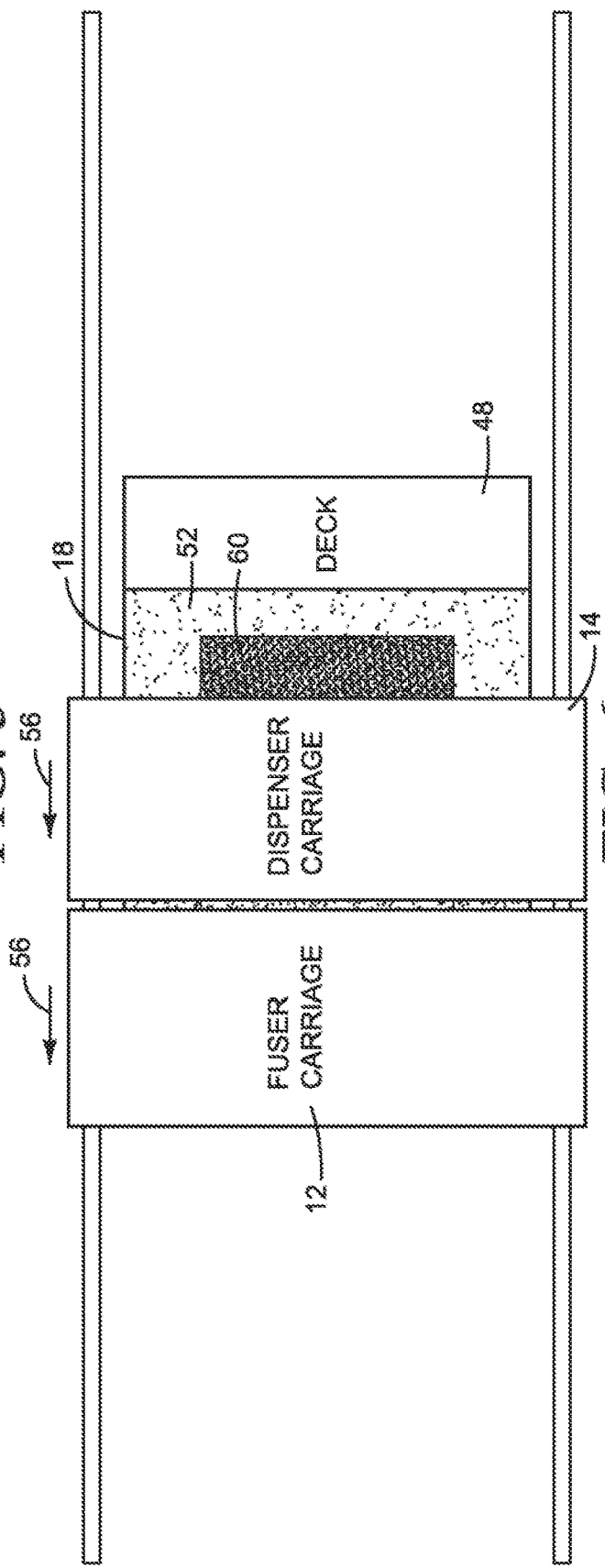

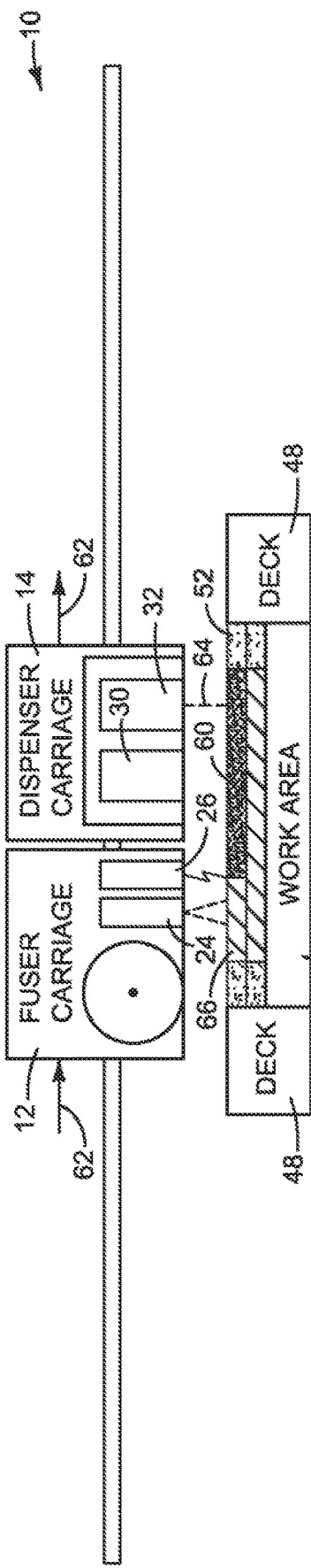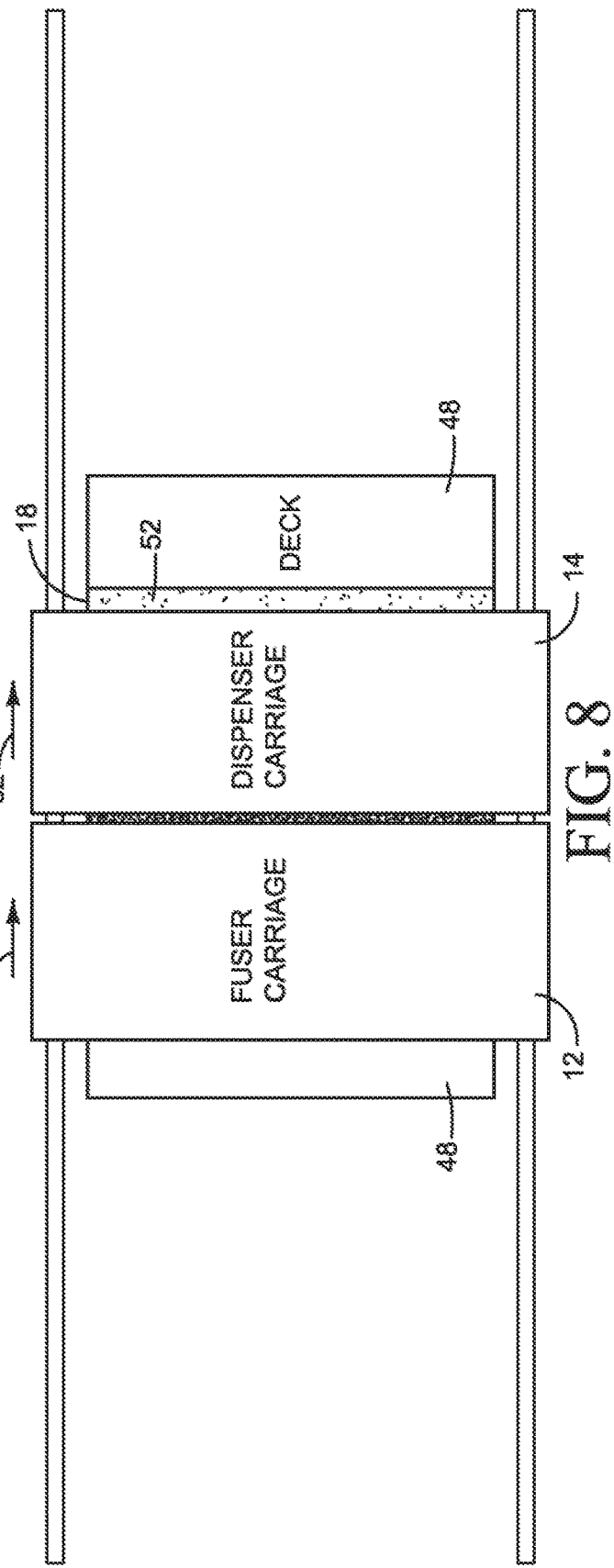

DEVIANT CONTROL IN ADDITIVE MANUFACTURING

BACKGROUND

Additive manufacturing machines produce 3D objects by building up layers of material. Some additive manufacturing machines are commonly referred to as "3D printers." 3D printers and other additive manufacturing machines make it possible to convert a CAD (computer aided design) model or other digital representation of an object into the physical object. The object model data may be processed into slices each defining that part of a layer or layers of build material to be formed into the object.

DRAWINGS

FIGS. 1 and 2 are elevation and plan views, respectively, illustrating one example of an additive manufacturing machine.

FIGS. 3-18 present a sequence of elevation and plan views illustrating one example of a process for thermal control using machine 10 shown in FIGS. 1 and 2.

The same part numbers designate the same or similar parts throughout the figures. The figures are not necessarily to scale.

DESCRIPTION

Figure 1:
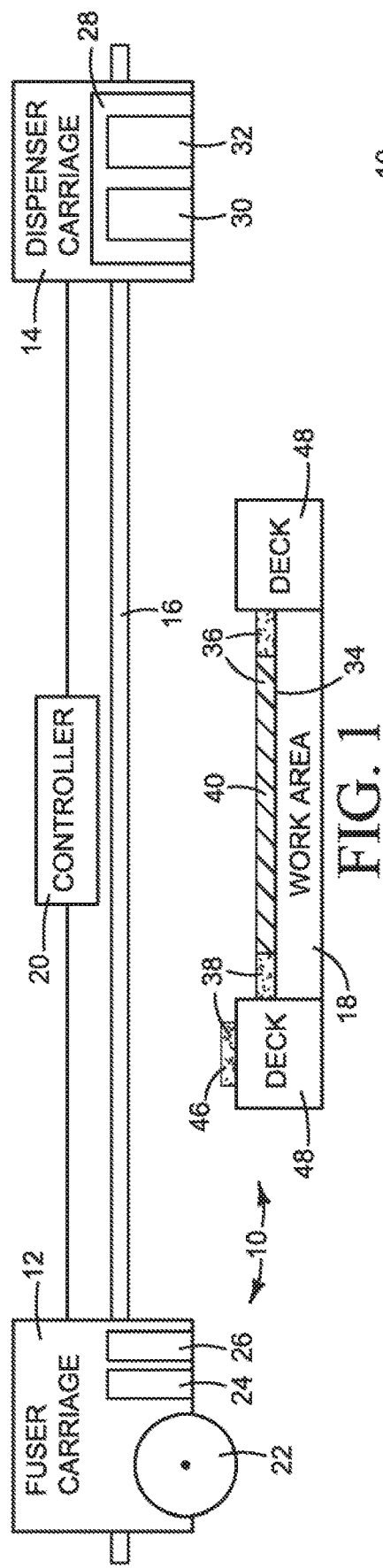

In some additive manufacturing processes, heat is used to fuse together the particles in a powdered build material to form a solid object. Heat to fuse the build material may be generated, for example, by applying a liquid fusing agent to a thin layer of powdered build material in a pattern based on the object slice and then exposing the patterned area to fusing light. Light absorbing components in the fusing agent absorb light energy to help sinter, melt or otherwise fuse the build material into a slice of the object. The process is repeated layer by layer and slice by slice to complete the object. Other functional agents may be used to produce the desired characteristics of an object. For example, detailing agents may be used to enhance or inhibit fusing in certain regions of an object, coloring agents may be used for different color objects or different colors in a single object, and other agents may be used to affect physical properties such as ductility and conductivity.

The way in which liquid functional agents interact with one another and their cumulative effect on the build material during additive manufacturing may be difficult to predict. For example, cyan, magenta and yellow coloring agents may absorb fusing light differently from one another, and much differently from a black fusing agent, and thus contribute relatively more or less fusing heat. In addition, dispensing even small quantities of any liquid agent can cool the affected work area noticeably during manufacturing. Thus, the competing thermal effects of each agent may influence the quality and characteristics of the object.

A new technique has been developed to help correctly balance the effects of multiple liquid functional agents during additive manufacturing. In one example, an additive manufacturing process includes, while making the object, measuring temperatures at multiple locations in the object, mapping any "hot" regions and any "cold" regions, and modifying the process control data to dispense a different quantity of at least one of the functional agents at the locations corresponding to each of the hot and cold regions, to reduce or eliminate the unwanted condition. For example, the quantity of fusing agent may be decreased at the hot regions for less heat and increased at the cold regions for more heat, to bring the temperatures into an acceptable range. Adjustments may made and their effects measured iteratively slice by slice while making the object or the adjustments may be made and their effects measured when making the object again.

Examples are not limited to detecting and correcting temperature deviations. Although temperature is comparatively easy to detect "on the fly" as an indicator of meaningful object properties, other parameters could be used. For example, it may be desirable in some implementations to detect color, density or conductivity. Accordingly, these and other examples shown in the figures and described below illustrate but do not limit the scope of the patent, which is defined in the Claims following this Description.

As used in this document, "and/or" means at least one of the connected things; "cold" and "low temperature" mean below a temperature threshold; a "coloring agent" means a substance that colors a build material; a "detailing agent" means a substance that inhibits or prevents or enhances fusing a build material, for example by modifying the effect of a fusing agent; "deviant" means not acceptable; a "fusing agent" means a substance that causes or helps cause a build material to sinter, melt or otherwise fuse; "hot" and "high temperature" mean above a temperature threshold; a "lamp" means any device that emits light; "light" means electromagnetic radiation of any wavelength; a "liquid" means a fluid not composed primarily of a gas or gases; a "processor readable medium" means any non-transitory tangible medium that can embody, contain, store, or maintain instructions for use by a processor and may include, for example, circuits, integrated circuits, ASICs (application specific integrated circuits), hard drives, random access memory (RAM), read-only memory (ROM), and memory cards and sticks; and "work area" means any suitable structure to support or contain build material for fusing, including underlying layers of build material and in-process slice and other object structures.

Figure 2:
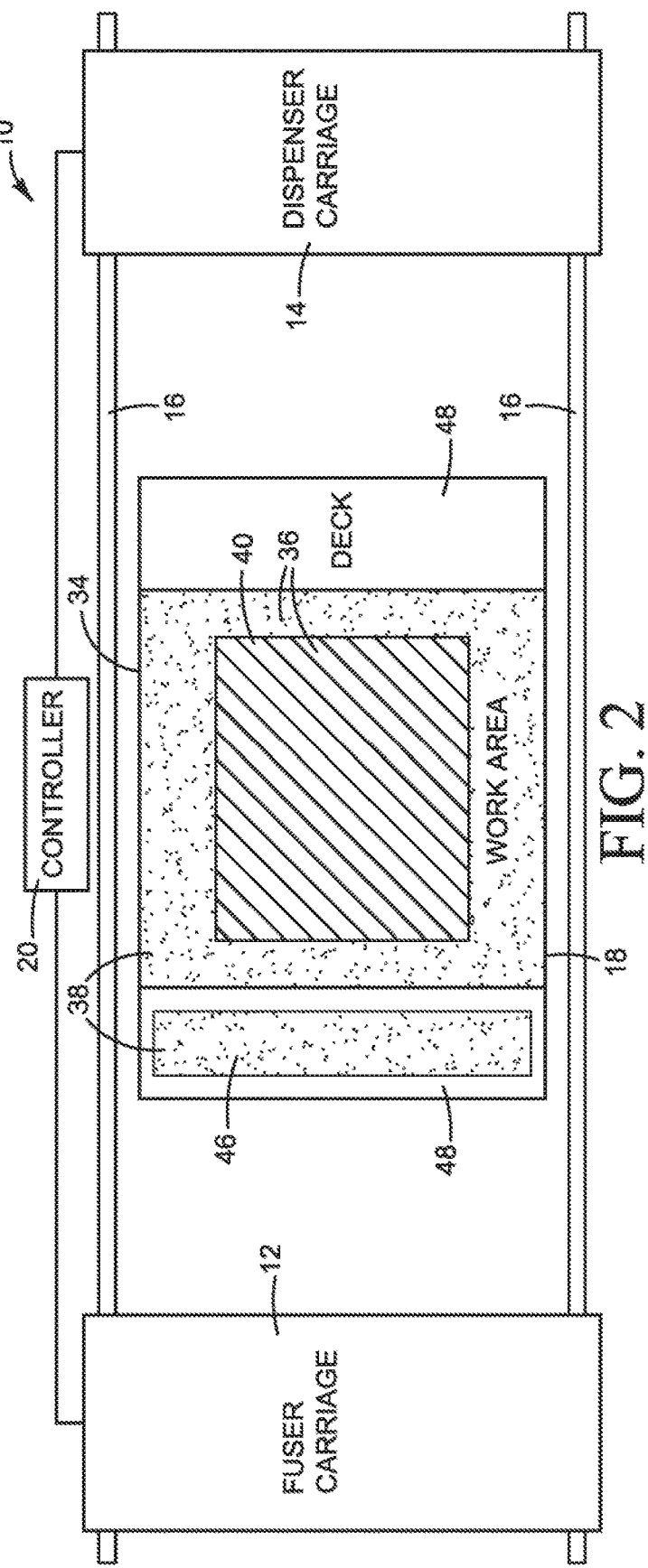

FIGS. 1 and 2 are elevation and plan views, respectively, illustrating one example of an additive manufacturing machine 10. FIGS. 3-18 present a sequence of elevation and plan views showing one example of a process for thermal control using machine 10. Referring first to FIGS. 1 and 2, additive manufacturing machine 10 includes a first, "fuser" carriage 12 and a second, "dispenser" carriage 14. Carriages 12 and 14 move back and forth, for example on rails 16, over a work area 18 at the direction of a controller 20. Controller 20 represents the processor (or multiple processors), the associated memory (or multiple memories) and instructions, and the electronic circuitry and components needed to control the operative elements of machine 10.

Fuser carriage 12 carries a layering device 22, a property detector 24, and a fusing lamp 26. Dispenser carriage 14 carries an inkjet printhead assembly or other suitable liquid dispensing assembly 28 to dispense multiple liquid functional agents. In the example shown, dispensing assembly 28 includes two dispensers 30 and 32. Each dispenser 30, 32 may dispense one or multiple functional agents, including for example, a fusing agent, a detailing agent and multiple coloring agents.

Work area 18 represents any suitable structure to support or contain build material for fusing, including underlying layers of build material and in-process slice and other object structures. For a first layer of build material, for example, work area 18 may be formed on the surface of a platform 34 that moves up and down to accommodate the layering process. For succeeding layers of build material, for example as shown in FIG. 1, work area 18 may be formed on an underlying object structure 36, which may include unfused build material 38 and build material that has been fused into an object slice 40.

In the example shown in FIGS. 1 and 2, layering device 22 is implemented as a roller 22 that moves between a deployed position (shown in FIG. 1) to layer build material as carriage 12 moves over work area 18 and a retracted position (shown in FIG. 5) to not layer build material as carriage 12 moves over work area 18. Layering roller 22 may rotate freely as it is moved over work area 18, freewheeling clockwise or counter-clockwise depending on the direction of travel, or roller 22 may be driven rotationally in either direction (co-rotated or counter-rotated). Other implementations for a layering device 22 are possible including, for example, a blade or a device that dispenses build material directly over the work area in a layer.

Figure 19:
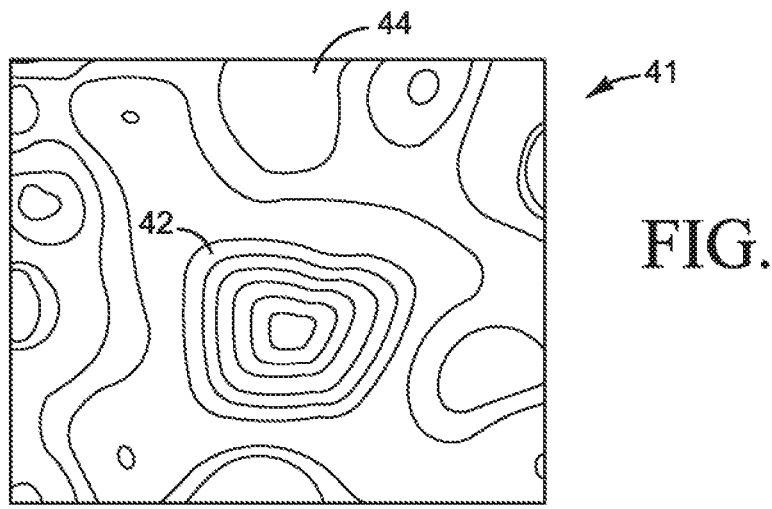
FIGS. 19-21 illustrate example thermographs corresponding to the object slice shown in FIGS. 2, 10, and 18, respectively.

In the example shown in FIGS. 1 and 2, property detector 24 is implemented as a thermal imaging device 24, such as an infrared camera or other suitable device for measuring temperatures in an object slice 40. Temperature measurements from device 24 are mapped to the corresponding locations in slice 40 to form a thermal map of the slice. Depending on the capabilities of the thermal imaging device 24, temperature mapping may be performed by device 24 and mapping data transmitted to controller 20 for processing, or temperature mapping may be performed by controller 20. One example of a temperature map 41 for object slice 40 in FIGS. 1 and 2 is shown in FIG. 19. To represent temperature on a black and white line drawing, "isotemp" lines are used to show different temperature regions. Higher temperature regions in the object slice are depicted by more dense groupings of lines and lower temperature regions are depicted by less dense groupings of lines. Map 41 shows a hot region 42 near the center of slice 40 and a cold region 44 along one edge of slice 40.

Although a single fusing lamp 26 is depicted, multiple fusing lamps may be used, for example to enable a greater range of fusing light.

In FIGS. 1 and 2, fuser carriage 12 is parked on one side of work area 18 (the left side in FIGS. 1 and 2) and dispenser carriage 14 is parked on the other side of work area 18 (the right side in FIGS. 1 and 2). In this example, a ribbon 46 of build material powder 38 has been deposited along a left side deck 48 adjacent to work area 18. In FIGS. 3 and 4, fuser carriage 12 is moving to the right in a first pass, indicated by motion arrows 50, with roller 22 deployed to layer build material 38 in a layer 52 over work area 18 (underlying structure 36). Although a powdered build material 38 is depicted by stippling in the figures, any suitable fusable build material may be used.

In FIGS. 5 and 6, fuser carriage 12 and dispenser carriage 14 are moving to the left in a second pass, indicated by motion arrows 56, with layering roller 22 retracted and fusing lamp 26 turned on to pre-heat build material 38 in layer 52. In other examples, build material 38 is not pre-heated or it is pre-heated with a heating lamp separate from the fusing lamp. Other pre-heating configurations are possible.

Still referring to FIGS. 5 and 6, dispenser 30 on dispenser carriage 14 following fuser carriage 12 dispenses a fusing agent 58 on to build material 38 in layer 52 in a pattern 60 corresponding to the desired object slice. For example, a lesser quantity of fusing agent 58 may be dispensed at the location of hot region 42 in slice 40 to lower the temperature in the corresponding region of the new slice and a greater quantity of fusing agent 58 may be dispensed at the location of cold region 44 in slice 40 to raise the temperature in the corresponding region in the new slice. Although only a fusing agent 58 is shown, other functional agents may be dispensed from one or both dispensers 30, 32 on to build material 38 as dispenser carriage 14 is moved to the left over work area 18 in FIGS. 5 and 6.

In FIGS. 7 and 8, as dispenser carriage 14 is moved to the right in a third pass, indicated by motion arrows 62, dispenser 32 dispenses a coloring agent 64 on to build material 38 in layer 52. Although only a coloring agent 64 is shown, other functional agents may be dispensed from one or both dispensers 30, 32 on to build material 38 as dispenser carriage 14 is moved to the right over work area 18 in FIGS. 7 and 8. Also in this third pass, fuser carriage 12 follows dispenser carriage 14 over work area 18 with fusing lamp 26 turned on to irradiate patterned build material 60 with fusing light to fuse patterned build material into a second object slice 66. Thermal imaging device 24 is turned on to measure temperatures in slice 66.

Figure 9:
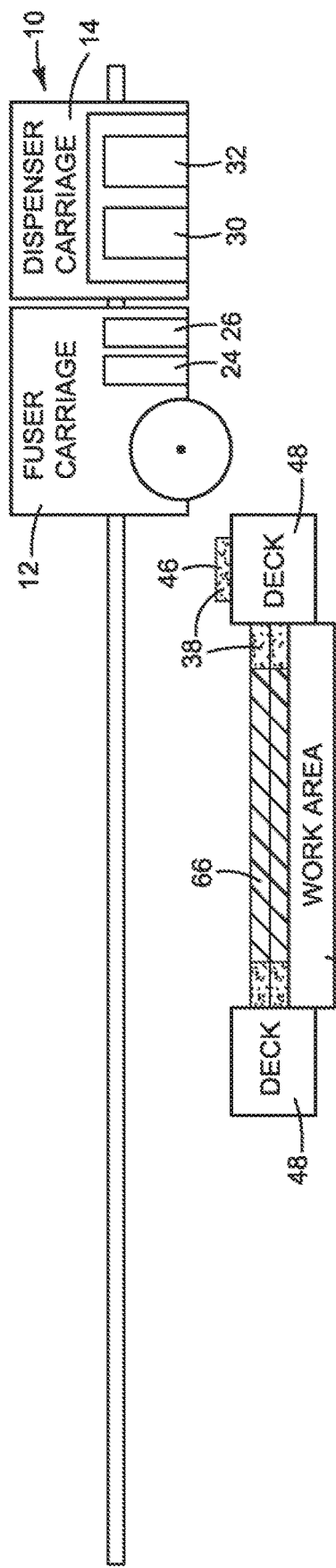
Figure 10:
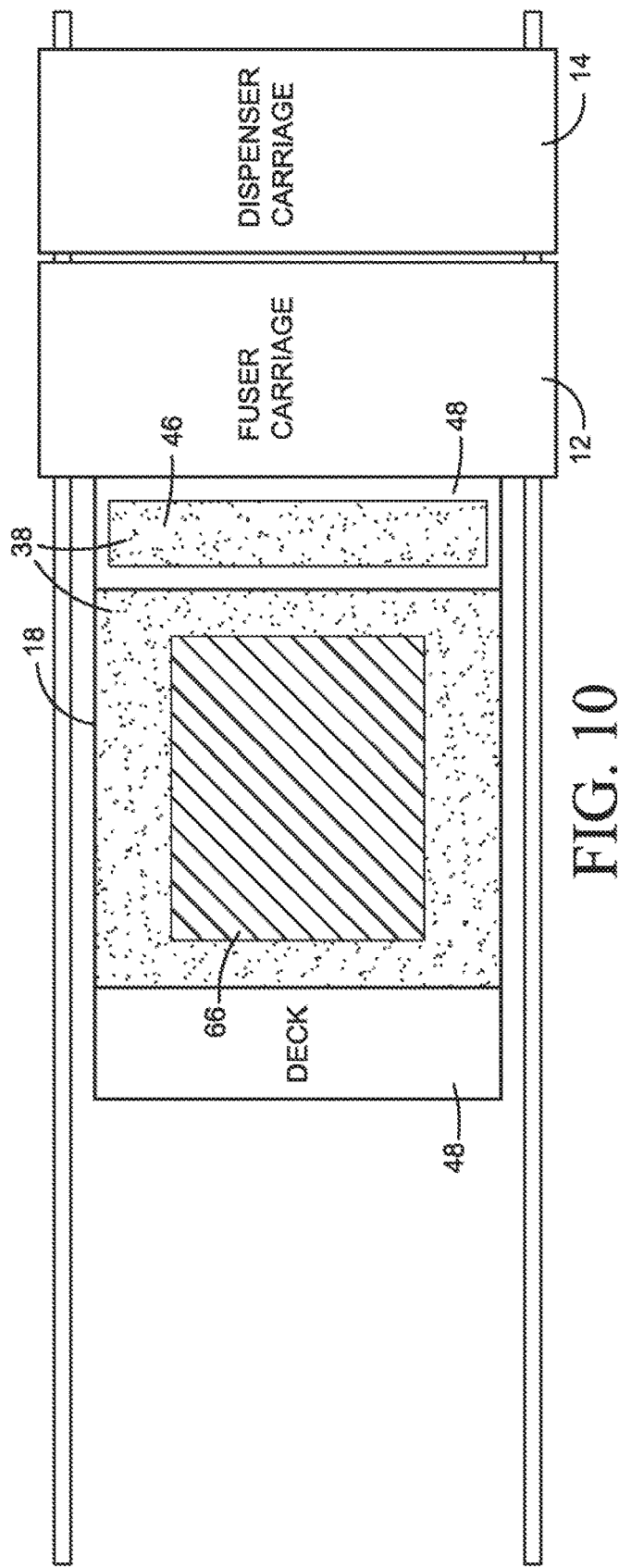
Figure 20:
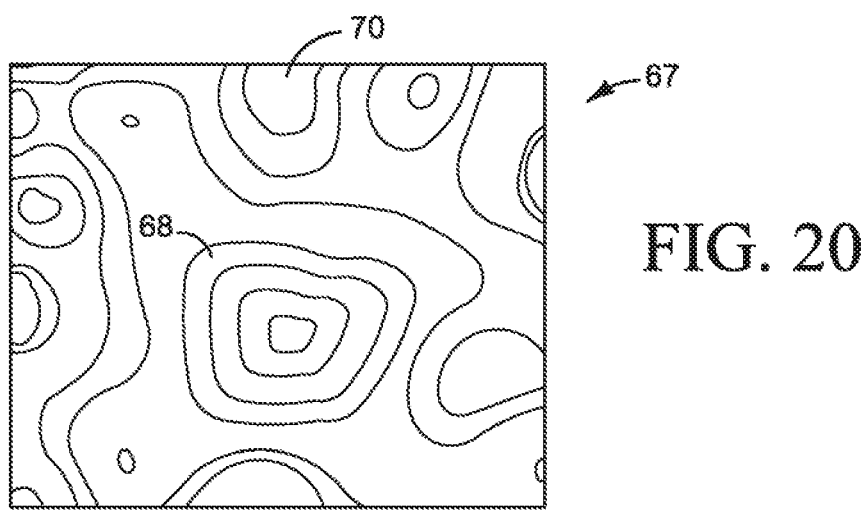

In FIGS. 9 and 10, fuser carriage 12 and dispenser carriage 14 have reached the right side of work area 18 after forming second slice 66 and a ribbon 46 of build material 38 has been dispensed to supply deck 48 on the right side of work area 18 in preparation for making the next slice. One example of a thermal map 67 for object slice 66 in FIGS. 9 and 10 is shown in FIG. 20. Although map 67 shows a hot region 68 near the center of slice 66 and a cold region 70 along one edge of slice 66. However, the lesser quantity of fusing agent 58 dispensed at the location of hot region 42 in the preceding slice 40 has lowered the temperature in the corresponding region 68 of the new slice 66, as indicated by the less dense isotemp lines in region 68, and a greater quantity of fusing agent 58 dispensed at the location of cold region 44 in the preceding slice 40 has raised the temperature in the corresponding region 70 in the new slice 66, as indicated by the more dense isotemp lines in region 70.

Figure 11:
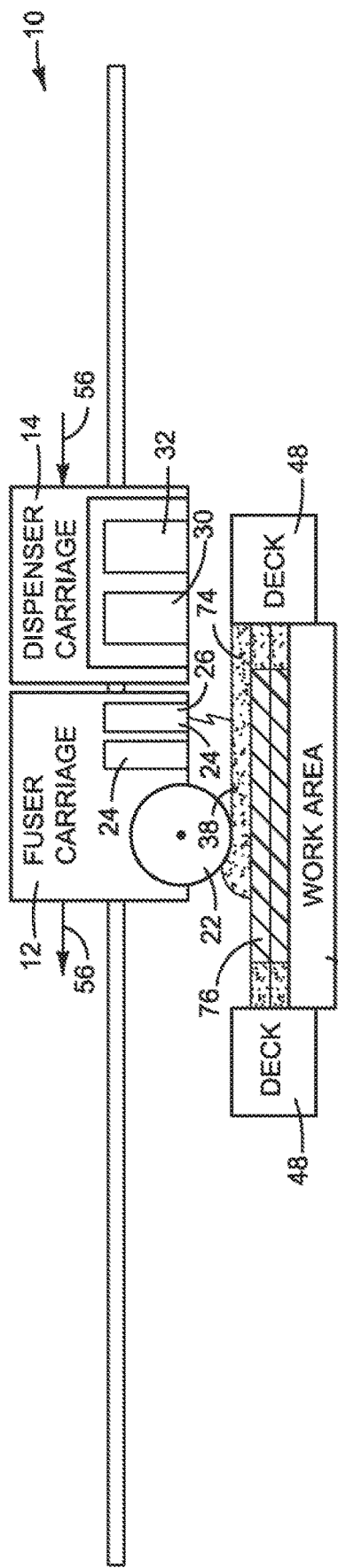
Figure 12:
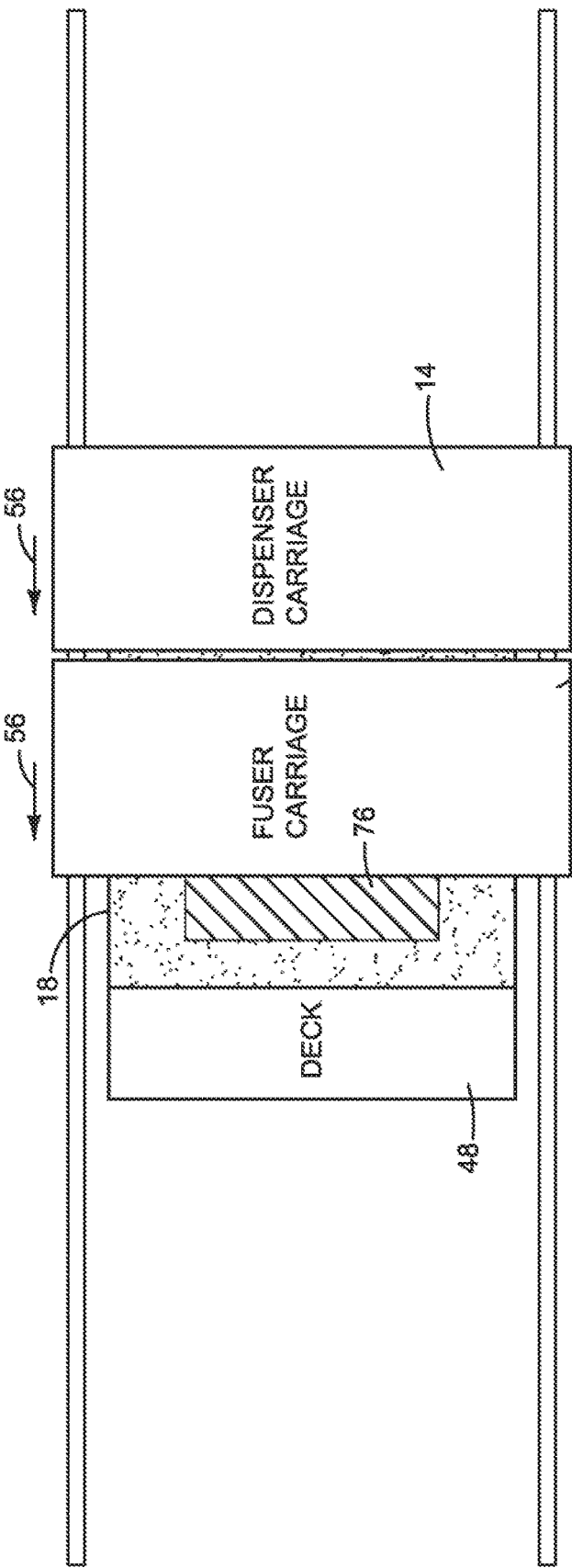
Figure 13:
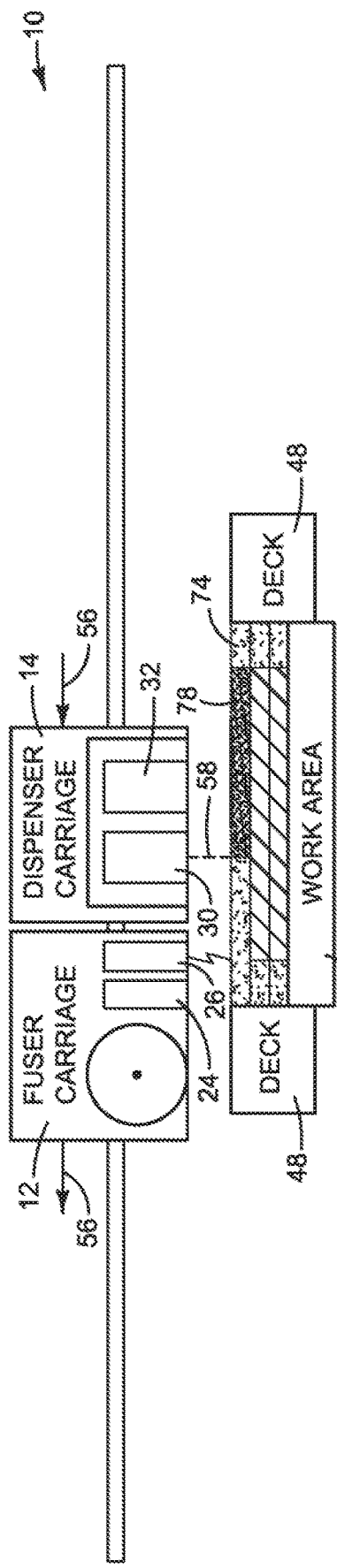
Figure 14:
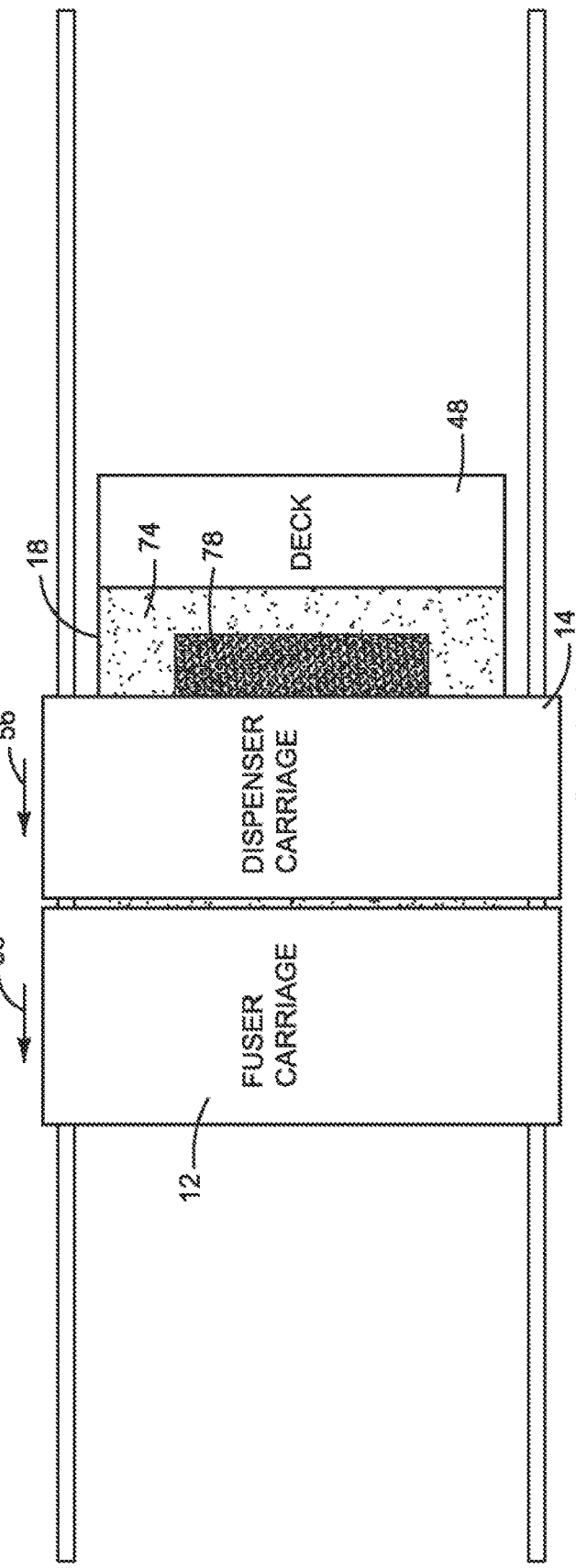

The sequence of operations is repeated for the next slice, as shown in FIGS. 11-18. In FIGS. 11-12 and 13-14, fuser carriage 12 and dispenser carriage 14 are moving to the left in a first pass, indicated by motion arrows 56. In FIGS. 11 and 12, roller 22 is deployed to layer build material 38 in a next layer 74 over work area 18 (now underlying structure 76) and fusing lamp 26 is turned on to pre-heat build material 38 in layer 74. In FIGS. 13 and 14, as carriages 12, and 14 continue across work area 18, dispenser 30 dispenses a fusing agent 58 on to build material in layer 74 in a pattern 78 corresponding to the next object slice. For example, a lesser quantity of fusing agent 58 may be dispensed at the location of hot region 68 in slice 66 to lower the temperature in the corresponding region of the new slice and a greater quantity of fusing agent 58 may be dispensed at the location of cold region 70 in slice 66 to raise the temperature in the corresponding region in the new slice. Although only a fusing agent 58 is shown, other functional agents may be dispensed from one or both dispensers 30, 32 on to build material layer 74 as dispenser carriage 14 is moved to the left over work area 18 in FIGS. 13 and 14.

Figure 15:
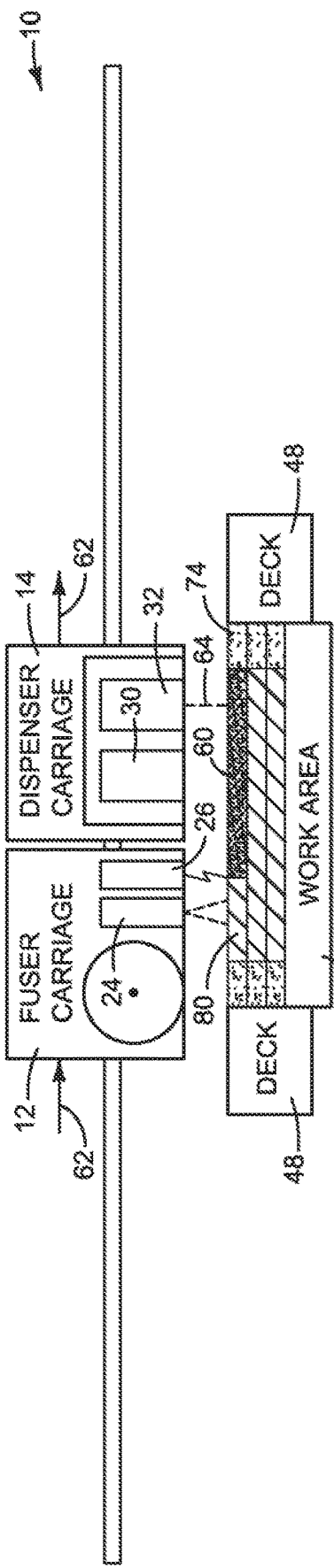
Figure 16:
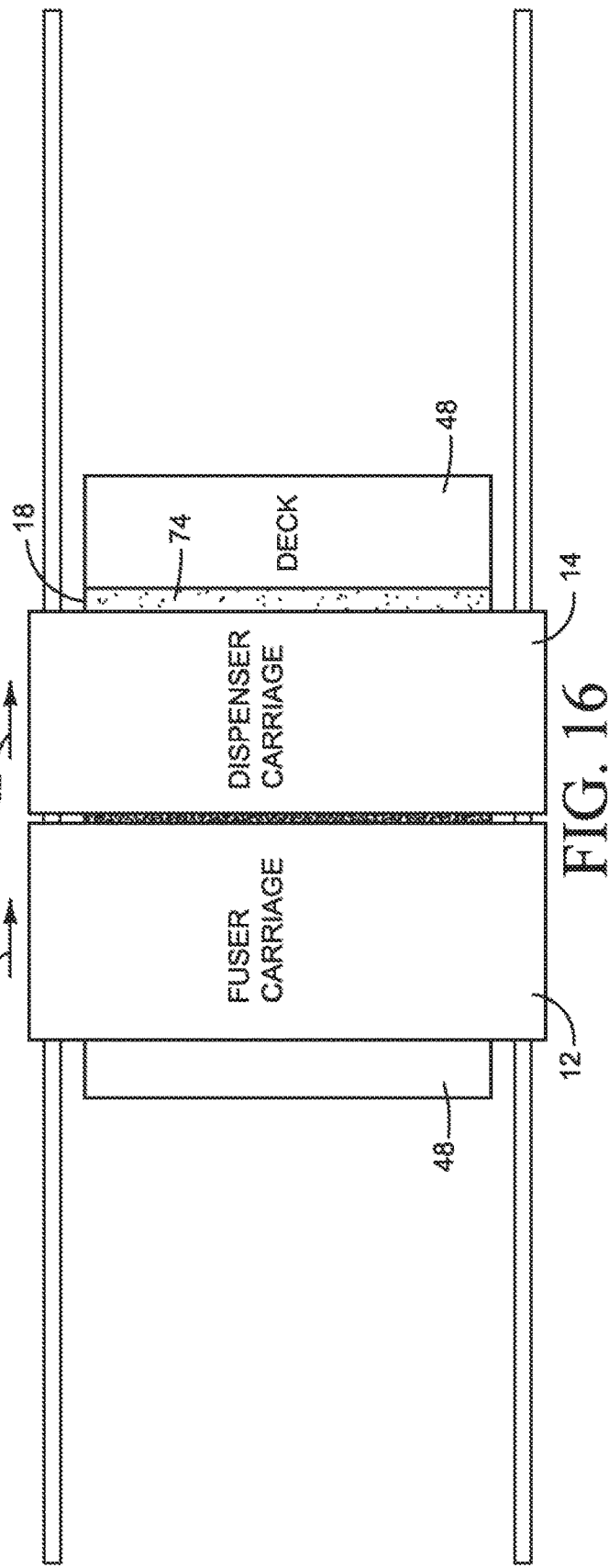

In FIGS. 15 and 16, as dispenser carriage 14 moves to the right in a second pass, indicated by motion arrows 62, dispenser 32 dispenses a coloring agent 64 on to build material in layer 74. Although only a coloring agent 64 is shown, other functional agents may be dispensed from one or both dispensers 30, 32 on to build material layer 74 as dispenser carriage 14 is moved to the right over work area 18 in FIGS. 15 and 16. Also in this second pass, fuser carriage 12 follows dispenser carriage 14 over work area 18 with fusing lamp 26 turned on to irradiate patterned build material 78 with fusing light to fuse patterned build material into a third object slice 80. Thermal imaging device 24 is turned on to measure temperatures in slice 80.

Figure 17:
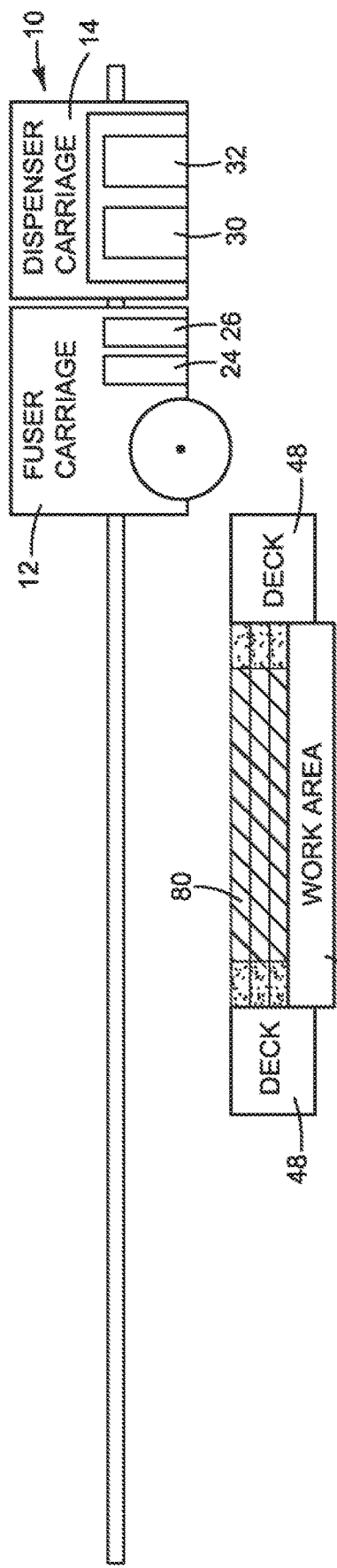
Figure 18:
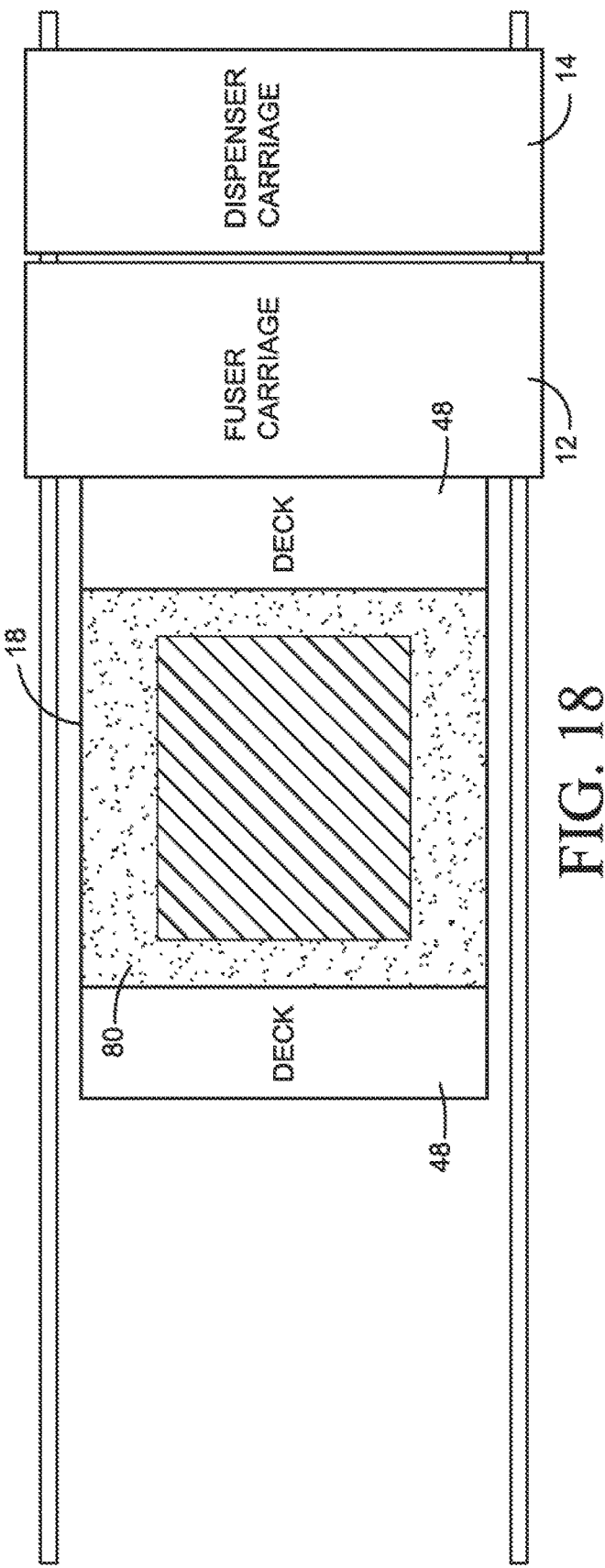
Figure 21:
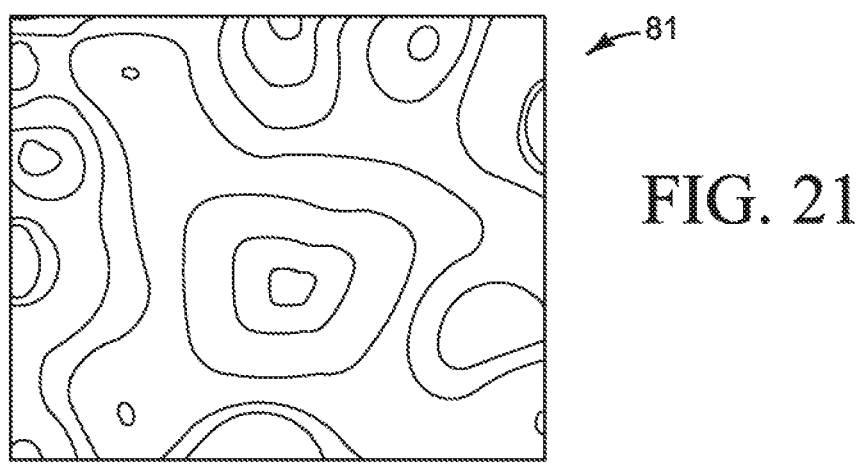

In FIGS. 17 and 18, fuser carriage 12 and dispenser carriage 14 have reached the right side of work area 18 after forming third slice 80. One example of a thermal map 81 for object slice 80 in FIGS. 17 and 18 is shown in FIG. 21. In map 81 there are no hot or cold regions.

The sequence of operations may continue for each succeeding layer of build material, slice by slice, until the object is completed.

The configuration and operating sequence of machine 10 in FIGS. 1-18 is just one example. Other suitable machine configurations and other operating sequences are possible. For example, an additive manufacturing machine 10 may include more or fewer carriages that move in-line with one another or perpendicular to one another, and with more or fewer agent dispensers, lamps and thermal imaging devices.

Figure 22:
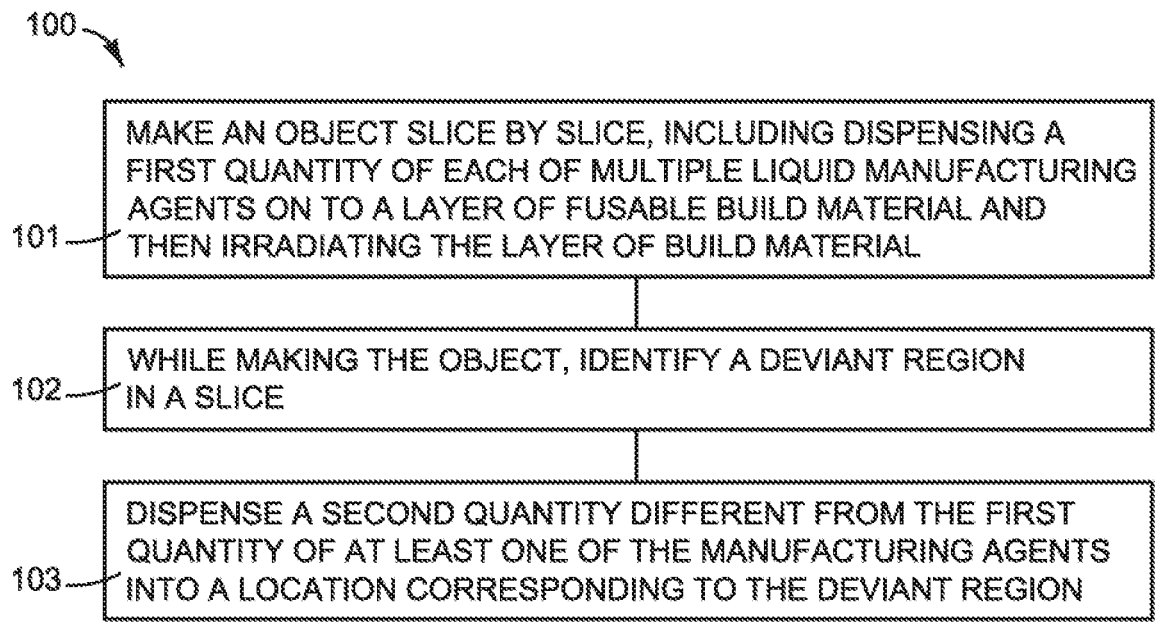
FIGS. 22-27 are flow diagrams illustrating example additive manufacturing processes.

FIG. 22 illustrates one example of an additive manufacturing process 100, such as might be implemented with a machine 10 shown in FIGS. 1 and 2. Referring to FIG. 22, an object is made slice by slice at block 101, including dispensing a first quantity of each of multiple liquid functional agents on to a layer of fusable build material and then irradiating the layer of build material, for example as shown in the sequence of operations illustrated in FIGS. 1-18. A deviant region in a slice is identified while making the object, at block 102, for example by identifying a hot region 42 and/or a cold region 44 on a temperature map in FIG. 19. And then, at block 103, a second quantity different from the first quantity of at least one of the functional agents is dispensed into a location corresponding to the deviant region, for example by dispensing a greater or lesser quantity of a fusing agent 58 as shown in FIGS. 5 and 13, and/or a lesser quantity or a greater quantity of a coloring agent 64, as shown in FIGS. 7 and 15.

Figure 23:
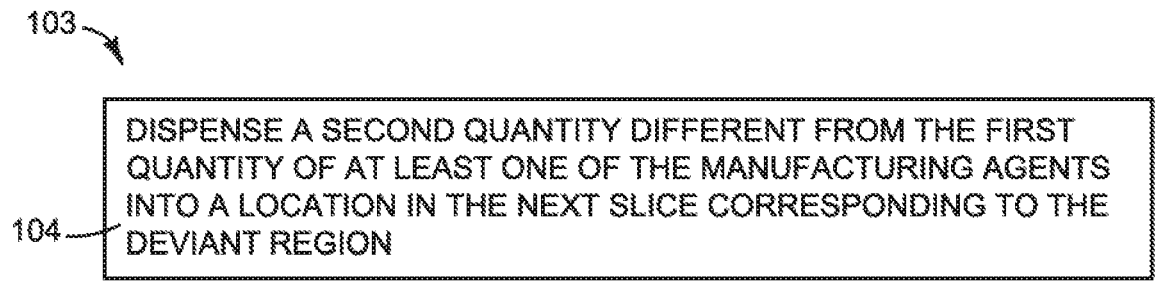
Figure 24:
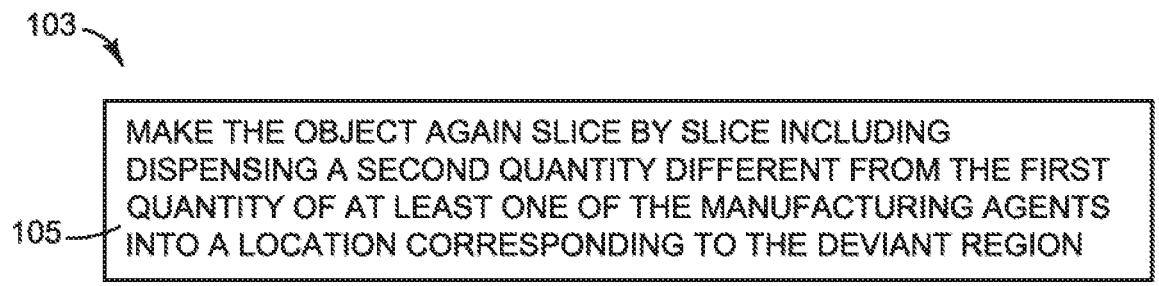

Dispensing a different quantity of one or more of the functional agents at block 103 in process 100 may be implemented by making the adjustment in the next slice of the same object, as shown at block 104 in FIG. 23, or by making the adjustment in the next object, as shown at block 105 in FIG. 24, or a combination of both succeeding slice and succeeding object adjustments.

Blocks 102 and 103 in process 100 may be implemented for a group of multiple slices rather than for individual slices. For example, it may be desirable in some manufacturing operations to measure and map the temperatures in every $2^{nd}$ or $3^{rd}$ or $4^{th}$ slice as a sufficiently accurate indicator of the temperatures in each of the individual slices in the group, and then adjusting the quantity of agent(s) to correct any temperature deviant regions in the succeeding $2^{nd}$ or $3^{rd}$ or $4^{th}$ slice and/or in the corresponding group of slices when making the next object.

Figure 25:
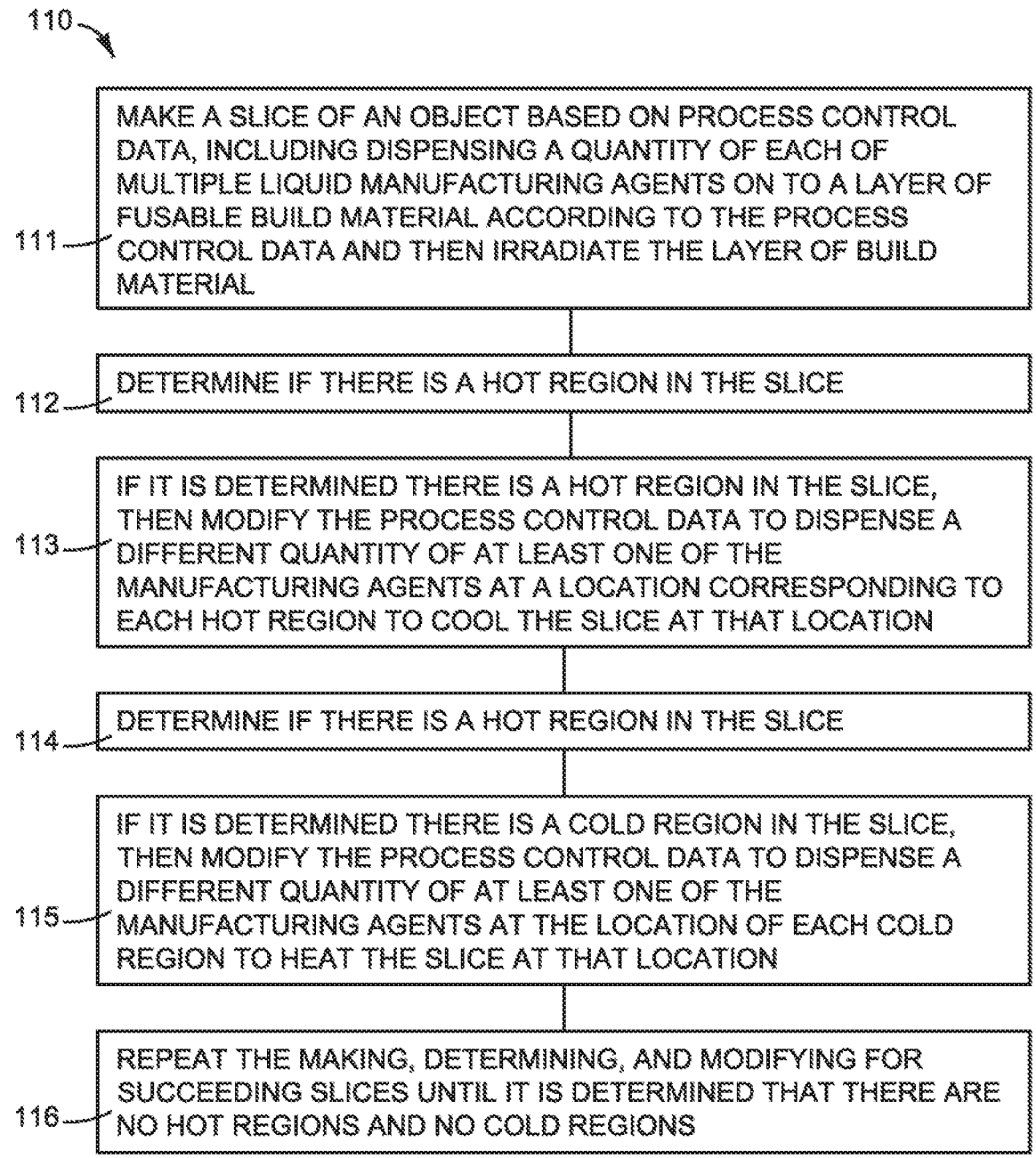

FIG. 25 illustrates another example of an additive manufacturing process 110, such as might be implemented with a machine 10 shown in FIGS. 1 and 2. Referring to FIG. 25, process 110 includes making a slice of an object based on process control data, including dispensing a quantity of each of multiple liquid functional agents on to a layer of fusable build material according to the process control data and then irradiating the layer of build material (block 111), and determining if there is a hot region in the slice (block 112). If it is determined there is a hot region in the slice, then modifying the process control data to dispense a different quantity of at least one of the functional agents at a location corresponding to each hot region to cool the slice at that location (block 113). Process 110 also includes determining if there is a cold region in the slice (block 114) and, if it is determined there is a cold region in the slice, then modifying the process control data to dispense a different quantity of at least one of the functional agents at the location of each cold region to heat the slice at that location (block 115). The acts of making (block 111), determining (blocks 112 and 114), and modifying (blocks 113 and 115) are repeated for succeeding slices until it is determined that there are no hot regions and no cold regions (block 116). The object can then be made again (and repeatedly) according to the last modified process control data.

Figure 26:
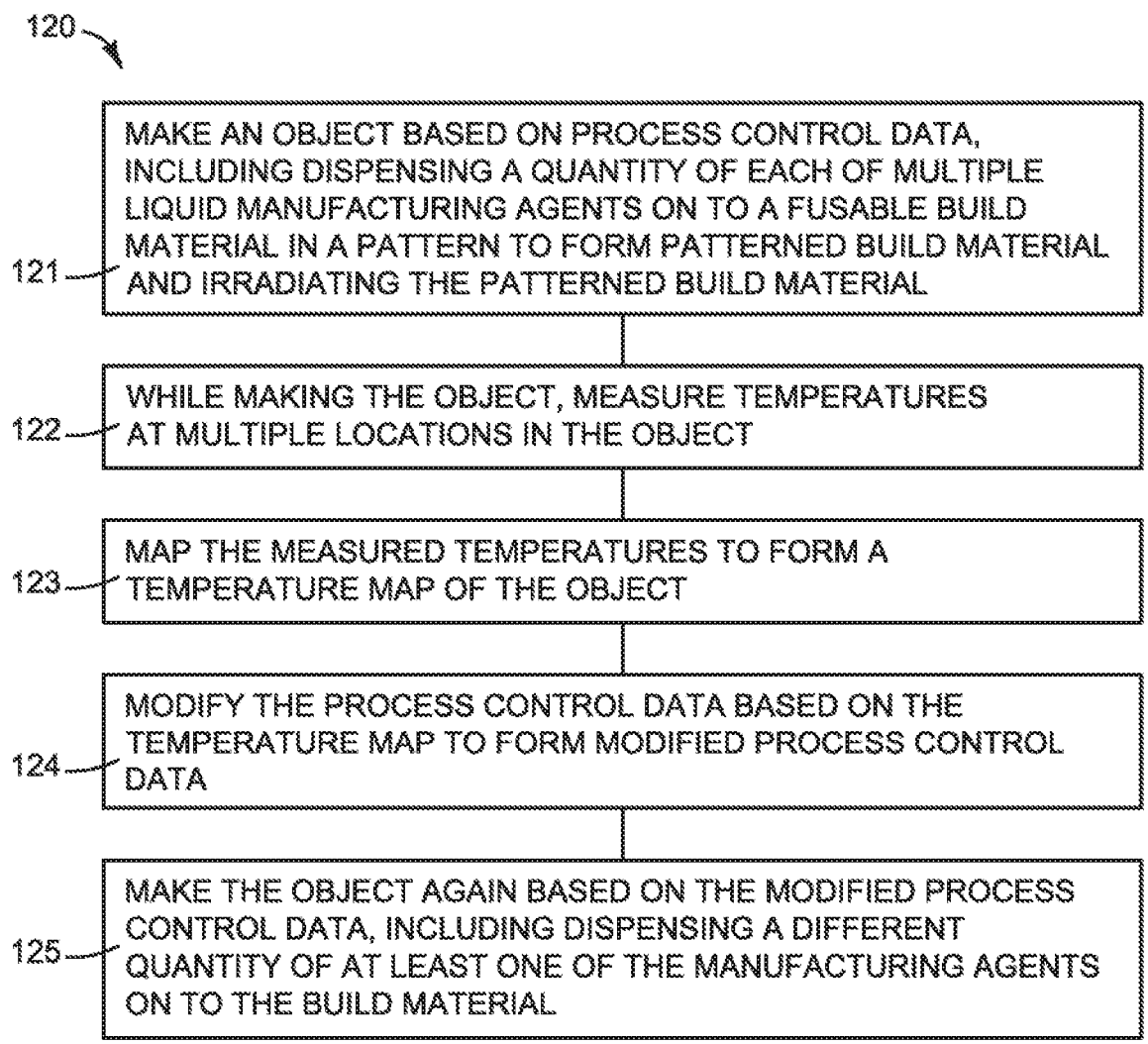

FIG. 26 illustrates another example of an additive manufacturing process 120, such as might be implemented with a machine 10 shown in FIGS. 1 and 2. Referring to FIG. 26, process 120 includes making an object based on process control data, including dispensing a quantity of each of multiple liquid functional agents on to a fusable build material in a pattern to form patterned build material and to irradiate the patterned build material (block 121) and, while making the object, measuring temperatures at multiple locations in the object (block 122). Process 120 also includes mapping the measured temperatures to form a temperature map of the object (block 123), modifying the process control data based on the temperature map (block 124) and then making the object again based on the modified process control data, including dispensing a different quantity of at least one of the functional agents on to the build material (block 125). Process control data for a group of multiple slices may be modified based on a temperature map for each of the individual slices in the group.

Figure 27:
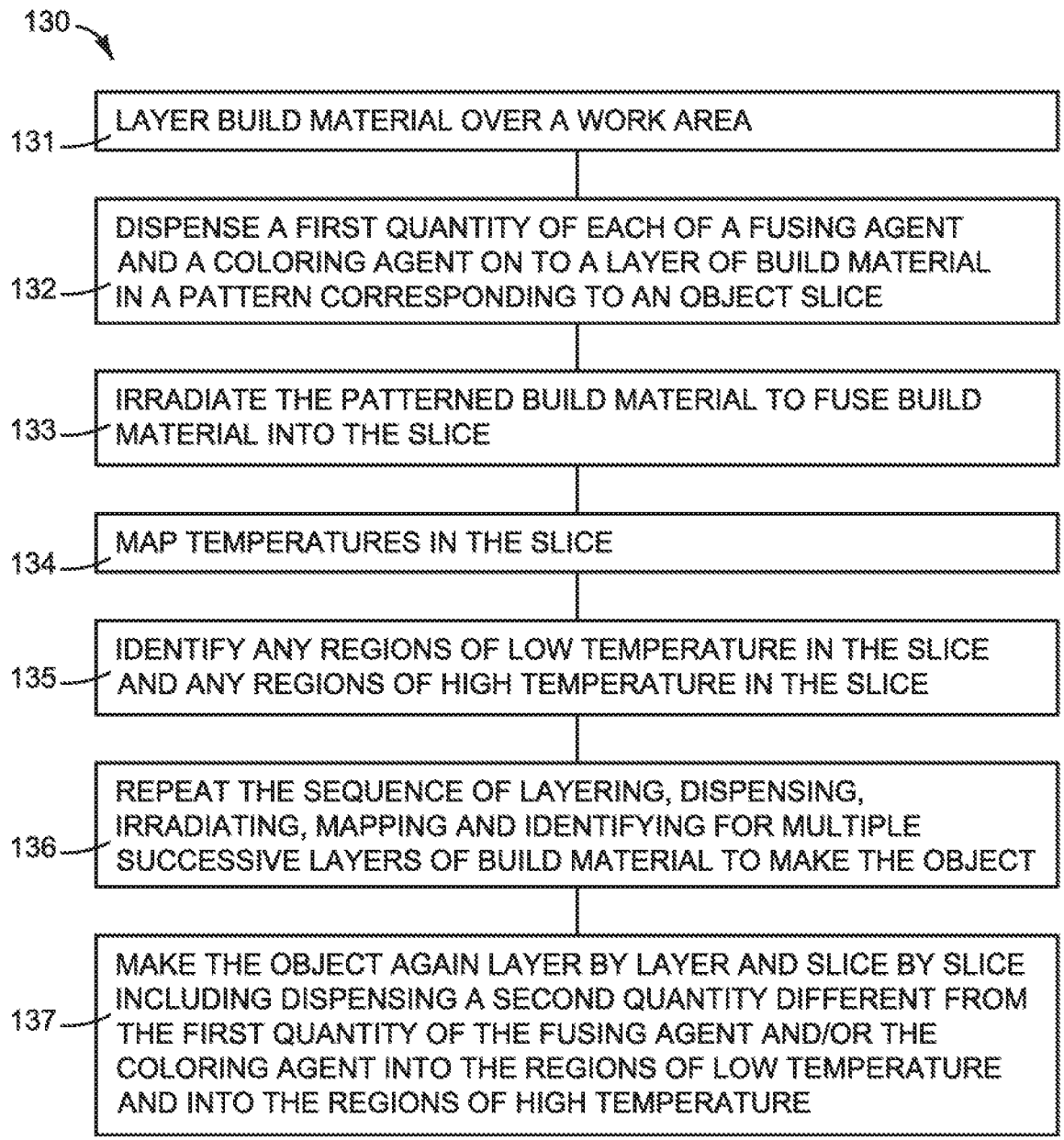

FIG. 27 illustrates another example of an additive manufacturing process 130, such as might be implemented with a machine 10 shown in FIGS. 1 and 2. Referring to FIG. 27, process 130 includes layering build material over a work area (block 131), dispensing a first quantity of each of the fusing agent and a coloring agent on to a layer of build material in a pattern corresponding to an object slice (block 132), and irradiating the patterned build material to fuse build material into the slice (block 133). Process 130 also includes mapping temperatures in the slice (block 134), identifying any regions of low temperature in the slice and any regions of high temperature in the slice (block 135), and repeating the sequence of layering, dispensing, irradiating, mapping and identifying for multiple successive layers of build material to make the object (block 136) and then making the object again layer by layer and slice by slice including dispensing a second quantity different from the first quantity of the fusing agent and/or the coloring agent into the regions of low temperature and into the regions of high temperature (block 137).

Figure 28:
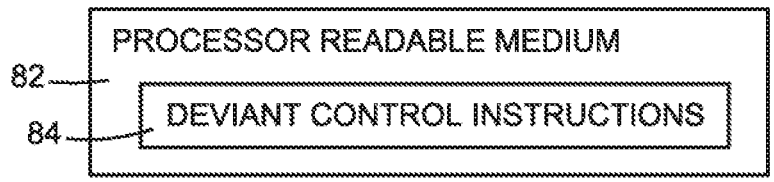
FIG. 28 is a block diagram illustrating one example of processor readable medium with deviant control instructions thereon to help form an object during additive manufacturing.

FIG. 28 is a block diagram illustrating a processor readable medium 82 with deviant control instructions 84 to help manufacture an object. For one example, instructions 84 may include instructions to execute process 100 in FIG. 22. For other examples, instructions 84 may include instructions to execute process 110 in FIG. 25, process 120 in FIG. 26, or process 130 in FIG. 27.

Processor readable medium 82 with deviant control instructions 84 may be implemented, for example, in a CAD computer program product, in an object model processor, and/or in a controller for an additive manufacturing machine. Process control data to adjust the quantity of fusing agents, color agents and/or other liquid functional agents may be generated "on the fly", for example, by processor readable instructions executed on the additive manufacturing machine controller.

Figure 29:
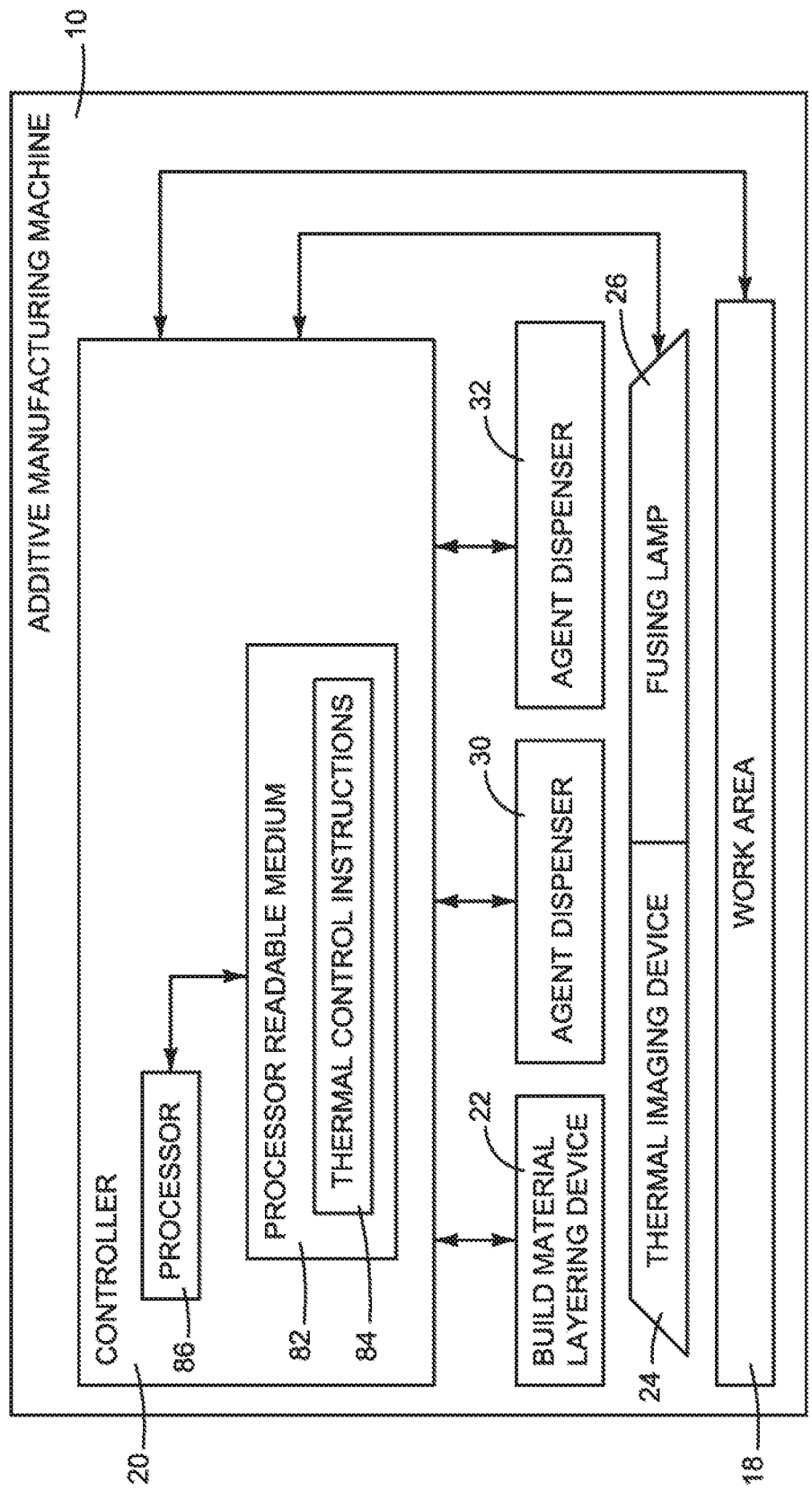
FIG. 29 is a block diagram illustrating one example of an additive manufacturing machine implementing a controller with thermal control instructions to help form an object during additive manufacturing.

FIG. 29 is a block diagram illustrating one example of an additive manufacturing machine 10 implementing a controller 20 with deviant control instructions 84. In this example, deviant control instructions 84 include instructions to control thermal deviations, for example as shown in FIGS. 1-18 and 25-27. Referring to FIG. 29, machine 10 includes controller 22, a work area 18, a build material layering device 22, a first fusing or other functional agent dispenser 30, a second coloring or other functional agent dispenser 32, a thermal imaging device 24 and a fusing lamp 26. Build material layering device 22 layers build material over work area 18 and may include, for example, a device to dispense the build material and a blade, brush or roller to spread the build material for each layer. Agent dispensers 30 and 32 dispense respective agents selectively at the direction of controller 20, for example as described above with reference to FIGS. 5, 7, 13 and 15. While any suitable dispensers 30, 32 may be used, inkjet printheads are sometimes used in additive manufacturing machines because of the precision with which they can dispense fusing, detailing, coloring and other functional agents and their flexibility to dispense different types and formulations of such agents.

As noted above, controller 20 represents the processor (or multiple processors), the associated memory (or multiple memories) and instructions, and the electronic circuitry and components needed to control the operative elements of machine 10. In particular, controller 20 includes a processor readable medium 82 with thermal control instructions 84 and a processor 86 to read and execute instructions 84. Thermal imaging device 24 may be implemented as an infrared camera or other suitable device for measuring temperatures in an object slice. Temperature measurements from device 24 may be mapped to the corresponding locations in the slice to form a thermal map of the slice. Depending on the capabilities of the thermal imaging device 24, temperature mapping may be performed by device 24 and mapping data transmitted to controller 20 for processing and/or temperature mapping may be performed by controller 20.

In one example, an additive manufacturing process includes: making an object slice by slice, including dispensing a first quantity of each of multiple liquid functional agents on to a layer of fusable build material and then irradiating the layer of build material; while making the object, identifying a deviant region in a slice; and dispensing a second quantity different from the first quantity of at least one of the functional agents into a location corresponding to the deviant region.

In one example, the process described in paragraph [0040] includes, while making the object, measuring a material property of each slice or group of slices in the object and where identifying a deviant region in a slice includes identifying a deviant region from the property measurements.

In one example, measuring a material property in the process described in paragraphs [0040] and [0041] includes measuring a temperature of each slice or group of slices in the object.

In one example, in the process described in paragraph [0040] dispensing a second quantity different from the first quantity of at least one of the functional agents into a location corresponding to the deviant region includes dispensing a second quantity different from the first quantity of at least one of the functional agents into a location in the next slice corresponding to the deviant region.

In one example, in the process described in paragraphs [0040] and [0043] identifying a deviant region in the object includes identifying regions of low temperature in the object and regions of high temperature in the object, and dispensing a second quantity different from the first quantity of at least one of the functional agents into a location corresponding to the deviant region includes dispensing a second quantity different from the first quantity of at least one of the functional agents into locations corresponding to the regions of low temperature and the regions of high temperature.

In one example, in the process described in paragraphs [0040], [0043] and [0044] making the object includes dispensing a fusing agent and multiple coloring agents each having a different light absorbability, and dispensing a second quantity different from the first quantity of at least one of the functional agents into a location corresponding to the deviant region includes dispensing a second quantity different from the first quantity of the fusing agent and/or at least one of the coloring agents into locations corresponding to the regions of low temperature and into locations corresponding to the regions of high temperature.

In one example, in the process described in paragraphs [0040] and [0043]-[0045] dispensing a second quantity different from the first quantity of at least one of the functional agents into a location corresponding to the deviant region includes dispensing a second quantity greater than the first quantity of the fusing agent into each location corresponding to a region of low temperature and dispensing a second quantity lesser than the first quantity of the fusing agent into each location corresponding to a region of high temperature.

In one example, in the process described in paragraph [0040], dispensing a second quantity different from the first quantity of at least one of the functional agents into a location corresponding to the deviant region includes making the object again slice by slice including dispensing a second quantity different from the first quantity of at least one of the functional agents into a location corresponding to the deviant region.

In one example, in the process described in paragraphs [0040] and [0048] identifying a deviant region in the object includes identifying regions of low temperature in the object and regions of high temperature in the object and making the object again slice by slice includes dispensing a second quantity different from the first quantity of at least one of the functional agents into locations corresponding to the regions of low temperature and the regions of high temperature.

In one example, in the process described in paragraphs [0040], [0047] and [0048] making the object includes dispensing a fusing agent and multiple coloring agents each having a different light absorbability and making the object again includes dispensing a second quantity different from the first quantity of the fusing agent and/or at least one of the coloring agents into locations corresponding to the regions of low temperature and into locations corresponding to the regions of high temperature.

In one example, in the process described in paragraphs [0040] and [0047]-[0049] making the object again includes dispensing a second quantity greater than the first quantity of the fusing agent into each location corresponding to a region of low temperature and dispensing a second quantity lesser than the first quantity of the fusing agent into each location corresponding to a region of high temperature.

As noted above, the examples shown in the figures and described herein illustrate but do not limit the scope of the patent, which is defined in the following Claims.

"A", "an" and "the" used in the claims means at least one. For example, "a" deviant region means at least one deviant region and "the" deviant region means the at least one deviant region.

The invention claimed is:

1. An additive manufacturing machine, comprising:
   a layering device to layer build material over a work area;
   an agent dispenser to dispense multiple liquid functional agents on to layered build material;
   a fusing lamp to irradiate layered build material;
   a property detector to detect a property of fused build material; and
   a controller operatively connected to the layering device, the agent dispenser, the fusing lamp and the property detector, the controller including a processor and a processor readable medium having instructions thereon that when executed by the processor cause the machine to:
   make an object a first time slice by slice until the object is completed based on process control data, including by dispensing a first quantity of each of multiple liquid functional agents on to a layer of fusable build material and then irradiating the layer of build material;
   while making the object the first time, detect a deviant region in which an object property is not acceptable;
   modify the process control data based on the deviant region to form modified process control data that corrects the deviant region; and
   make the object a second time slice by slice until the object is completed based on the modified process control data, including by dispensing a second quantity different from the first quantity of at least one of the functional agents into a location corresponding to the deviant region.

2. The machine of claim 1, where:
   the property detector comprises a thermal imaging device;
   the instructions to detect a deviant region include instructions to, while making the object the first time, identify a region of low temperature in the object and/or a region of high temperature in the object; and
   the instructions to dispense a second quantity different from the first quantity of at least one of the functional agents into a location corresponding to the deviant region include instructions to, while making the object the second time, dispense a second quantity different from the first quantity of at least one of the functional agents into a location corresponding to each region of low temperature and each region of high temperature.

3. The machine of claim 2, where:
   the multiple liquid functional agents include a fusing agent and multiple coloring agents each having a different light absorbability; and
   the instructions to dispense a second quantity different from the first quantity of at least one of the functional agents into a location corresponding to each region of low temperature and each region of high temperature include instructions to, while making the object the second time, dispense a second quantity different from the first quantity of the fusing agent and/or at least one of the coloring agents into a location corresponding to each region of low temperature and each region of high temperature.

4. A processor readable medium having instructions thereon that when executed cause an additive manufacturing machine to:
   make an object a first time slice by slice until the object is completed based on process control data for each slice, including by dispensing a quantity of each of multiple liquid functional agents on to a fusable build material in a pattern to form patterned build material and irradiating the patterned build material;
   while making the object the first time, measure temperatures at multiple locations in each of multiple individual slices in the object and/or in each of multiple groups of individual slices in the object;
   map the measured temperatures to form a temperature map of the object;
   modify the process control data based on the temperature map to form modified process control data that corrects for a region of low temperature and/or a region of high temperature; and
   make the object a second time slice by slice until the object is completed based on the modified process control data, including by dispensing a different quantity of at least one of the functional agents on to the build material.

5. The medium of claim 4, where the instructions to measure temperatures include instructions to measure temperatures at multiple locations in each of multiple groups of individual slices in the object.

6. The medium of claim 5, where the instructions to modify the process control data include instructions to modify the process control data for multiple slices based on a temperature map for each of those slices, to form the modified process control data.

7. An additive manufacturing machine controller implementing the processor readable medium of claim 4.

8. An additive manufacturing machine, comprising:
   a layering device to layer build material over a work area;
   an agent dispenser to dispense a fusing agent and multiple coloring agents on to layered build material;
   a fusing lamp to irradiate patterned build material;
   a thermal imaging device to map temperatures in fused build material; and
   a controller operatively connected to the layering device, the agent dispenser, the fusing lamp and the thermal imaging device, the controller including a processor and a processor readable medium having instructions thereon that when executed by the processor cause the machine to:
   layer build material over a work area;
   dispense a first quantity of each of the fusing agent and a coloring agent on to a layer of build material in a pattern corresponding to an object slice based on process control data for the slice;
   irradiate the patterned build material to fuse build material into the slice;
   map temperatures in the slice to form a temperature map of the slice;
   identify any regions of low temperature in the slice and any regions of high temperature in the slice;

repeat the sequence of layering, dispensing, irradiating, mapping and identifying for multiple successive layers of build material to make a completed object a first time;

modify the process control data for one or more of the slices based on a corresponding one or more of the temperature maps to form modified process control data that corrects for any regions of low temperature and/or any regions of high temperature; and then make the completed object a second time layer by layer and slice by slice based on the modified process control data, including dispensing a second quantity different from the first quantity of the fusing agent and/or the coloring agent into the regions of low temperature and into the regions of high temperature.

* * * * *